United States Patent [19]

Martin

[11] 4,037,159

[45] July 19, 1977

[54] CHIRP COMMUNICATION SYSTEM

[75] Inventor: Albert R. Martin, Melbourne Beach, Fla.

[73] Assignee: Harris Corporation, Cleveland, Ohio

[21] Appl. No.: 520,060

[22] Filed: Nov. 1, 1974

[51] Int. Cl.² .................... H04B 15/00; H03H 7/10; H03H 7/30
[52] U.S. Cl. .................... 325/30; 325/65; 325/126; 333/30 R; 343/17.2 PC
[58] Field of Search ............ 343/17.2 PC; 325/42, 325/43, 65, 30, 126, 32; 333/30 R, 72

[56] References Cited

U.S. PATENT DOCUMENTS

| | | | |
|---|---|---|---|
| 3,363,248 | 1/1968 | Nicodemus | 343/17.2 R |
| 3,736,587 | 5/1973 | Bush et al. | 325/32 X |
| 3,795,879 | 3/1974 | Whitehouse et al. | 333/30 R |
| 3,800,247 | 3/1974 | Tancrell et al. | 333/30 R |
| 3,845,419 | 10/1974 | Nudd | 333/30 R |
| 3,875,571 | 4/1975 | Davis, Jr. et al. | 343/17.2 PC X |
| 3,878,525 | 4/1975 | Alpers | 343/17.2 PC X |
| 3,887,918 | 6/1975 | Bailey et al. | 343/17.2 R |

Primary Examiner—Howard A. Birmiel

[57] ABSTRACT

A communication system that is difficult to jam has a transmitter transmitting successive chirp signals, which start at different initial frequencies and all have the same frequency - time slope. At the transmitter successive selections are made from among the different available chirp signal frequencies in accordance with a predetermined pseudorandom program that is known at the receiving station. The receiver has a chirp matched filter capable of receiving all of the different chirps but, being a distributed filter, it delays the different received chirps by differing amounts depending upon the initial frequency of each chirp. The output of the chirp filter is envelope-detected, and the resulting pulse signal is passed through a time gate that is gated on at a time that is selected in accordance with the predetermined program. The system has advantages for anti-jam communications, multiple-access communications, frequency diversity radio, and coding using multiple frequencies, as examples. The chirp matched filter is conveniently a surface wave device.

13 Claims, 5 Drawing Figures

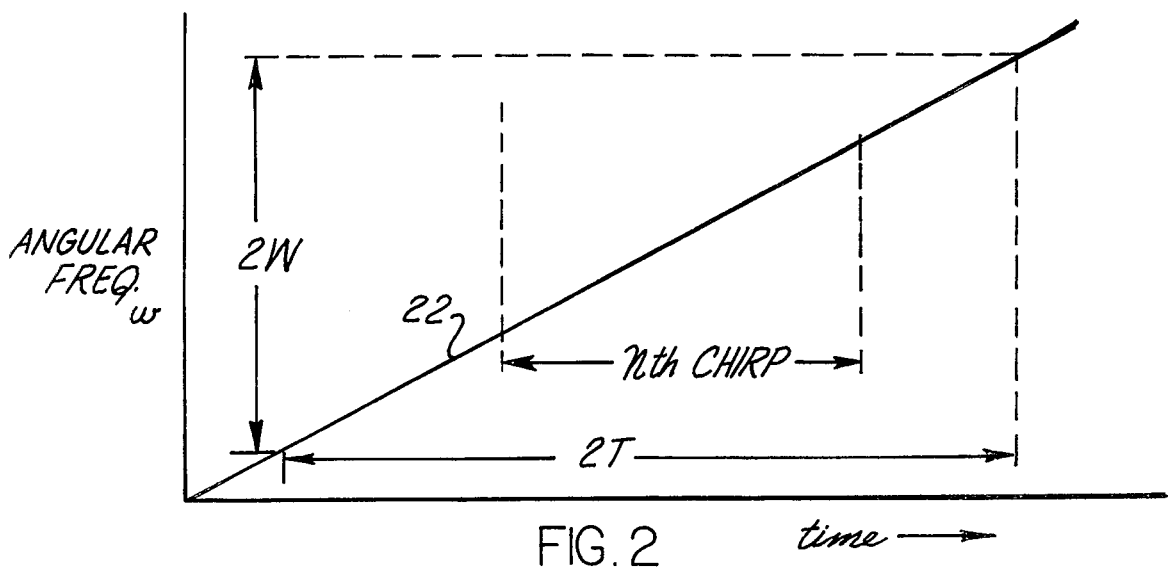
FIG. 2
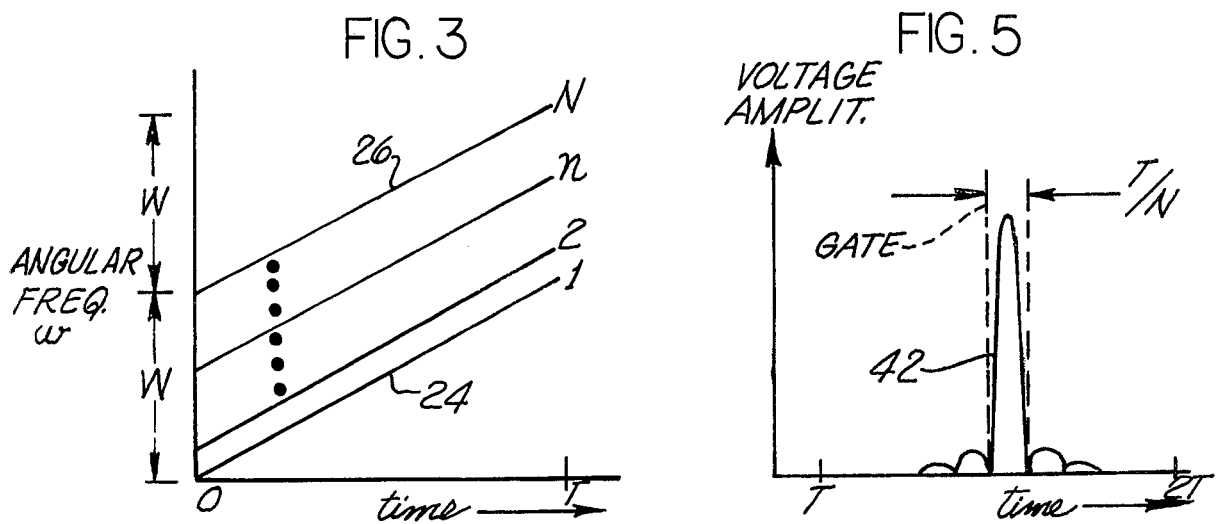
FIG. 3
FIG. 5
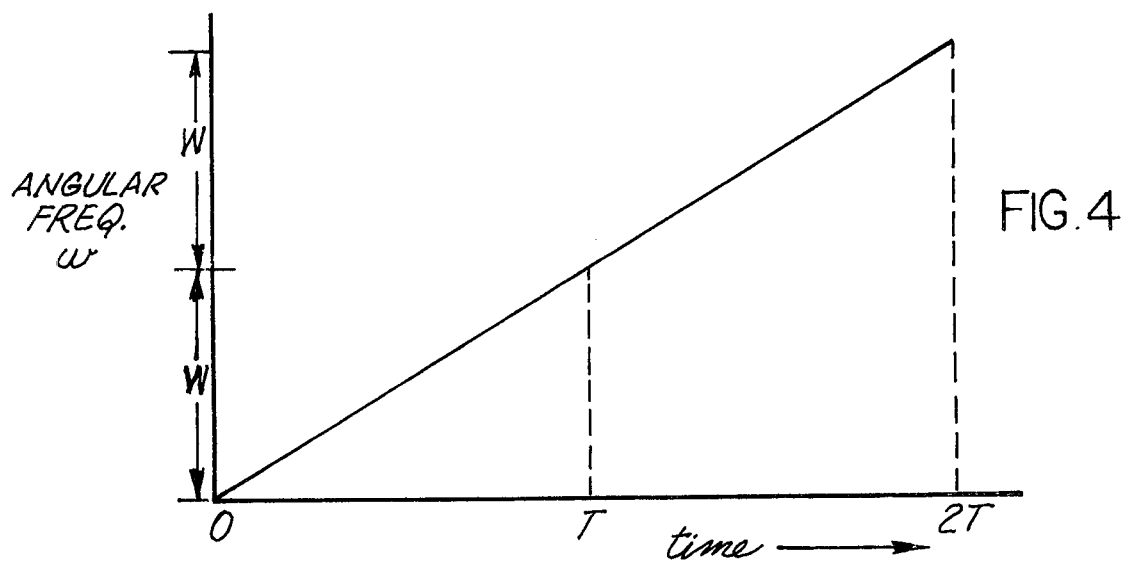
FIG. 4

4,037,159

CHIRP COMMUNICATION SYSTEM

BACKGROUND OF THE INVENTION

In the prior art and especially in the field of radar, pulse envelope modulated rf signals have had their spectrum spread over a time interval for transmission. At a receiver the signals are time-compressed, to recover aproximately the shape of the signals prior to spectrum spreading.

In some prior jam-resistant communications systems that are called frequency-hopping signal systems, continuous wave pulses are selected for transmission with any of a plurality of starting frequencies, which can be pseudo-random. In other conventional signaling systems, such as those called time-hopping systems, waveforms are transmitted at times which are selected from among a plurality of time slots, with the selection of time slot being pseudo-random if desired. Still other prior apparatus employs a principle known as direct sequence PN spreading, in which a coded sequence of N chips is transmitted in a given time interval, N being the number of orthogonal waveforms that are possible. The sequence is randomly changed by a key generator.

One problem with some systems of the prior art has been that the ratio of peak power to average power has been very high, with the consequence that the rf transmitter must have a relatively high power capability. In other systems a great amount of equipment has been required, especially at the receiver.

SUMMARY OF THE INVENTION

The present invention relates to the field of communication and especially to communication between stations when efforts are being made by others to jam the system. A spread spectrum pulse signal referred to hereinafter as a chirp signal is transmitted between the stations, with the starting frequency of each chirp signal selected from among a plurality of possible starting frequencies within a range. At the receiver a unitary distributed filter is employed for compressing the chirp signals. The unitary distributed filter is suitable for compressing chirp signals starting at any of the initial frequencies in the range.

Another aspect of the invention is that a sequence in which the initial frequencies of the chirp signals are selected, is controlled at the transmitter in accordance with predetermined criteria for generating a sequence. If desired the predetermined criteria maybe a pseudo-noise sequence which can be produced simultaneously at the receiver also, so that the receiver has prior information indicating the sequence of initial frequencies of chirps that it must receive.

In another aspect of the invention, the distributed filter, which compresses a received chirp to produce a pulse, produces the pulse after a time delay, and the amount of the time delay depends upon the initial frequency of the chirp signal. The receiver includes equipment, following the distributed filter, for gating the compressed pulses, and for changing the gating time to coincide with the varying times of occurrence of the compressed pulses.

In another aspect of the invention, surface wave devices are employed to produce the chirp waveforms of the transmitter and to compress the chirp waveforms into pulses of shorter duration of the receiver.

Other aspects of the invention include: providing a code tracking loop to keep the bit rate and phase of gating signals at the receiver equal to the rate and phase of chirps produced at the transmitter; producing chirp signals whose rate of change of frequency with respect to time is the same irrespective of the initial frequency; gating the chirp signals at uniform time intervals before they enter the distributed filter; and modulating the signal transmissions in any of a variety of ways, including representing a logic 1 by a chirp having an increasing frequency slope and a logic 0 by a chirp with a decreasing frequency slope.

Other aspects and features of the invention are brought out in the remainder of the specification, the claims, and the figures.

BRIEF DESCRIPTION OF FIGURES

FIG. 2 shows the impulse response of a surface wave device employed at the transmitting station of the preferred embodiment for producing chirp signals;

FIG. 3 shows the instantaneous angular frequency, as a function of time, of each of a plurality of possible transmitted chirp waveforms;

FIG. 4 is a graph of the impulse response of a surface wave device employed at the receiving station for compressing chirp waveforms;

FIG. 5 is a graph of the envelope of an output pulse from a distributed filter employed at the receiving station, drawn as a function of time.

DESCRIPTION OF A PREFERRED EMBODIMENT

Figure 1:
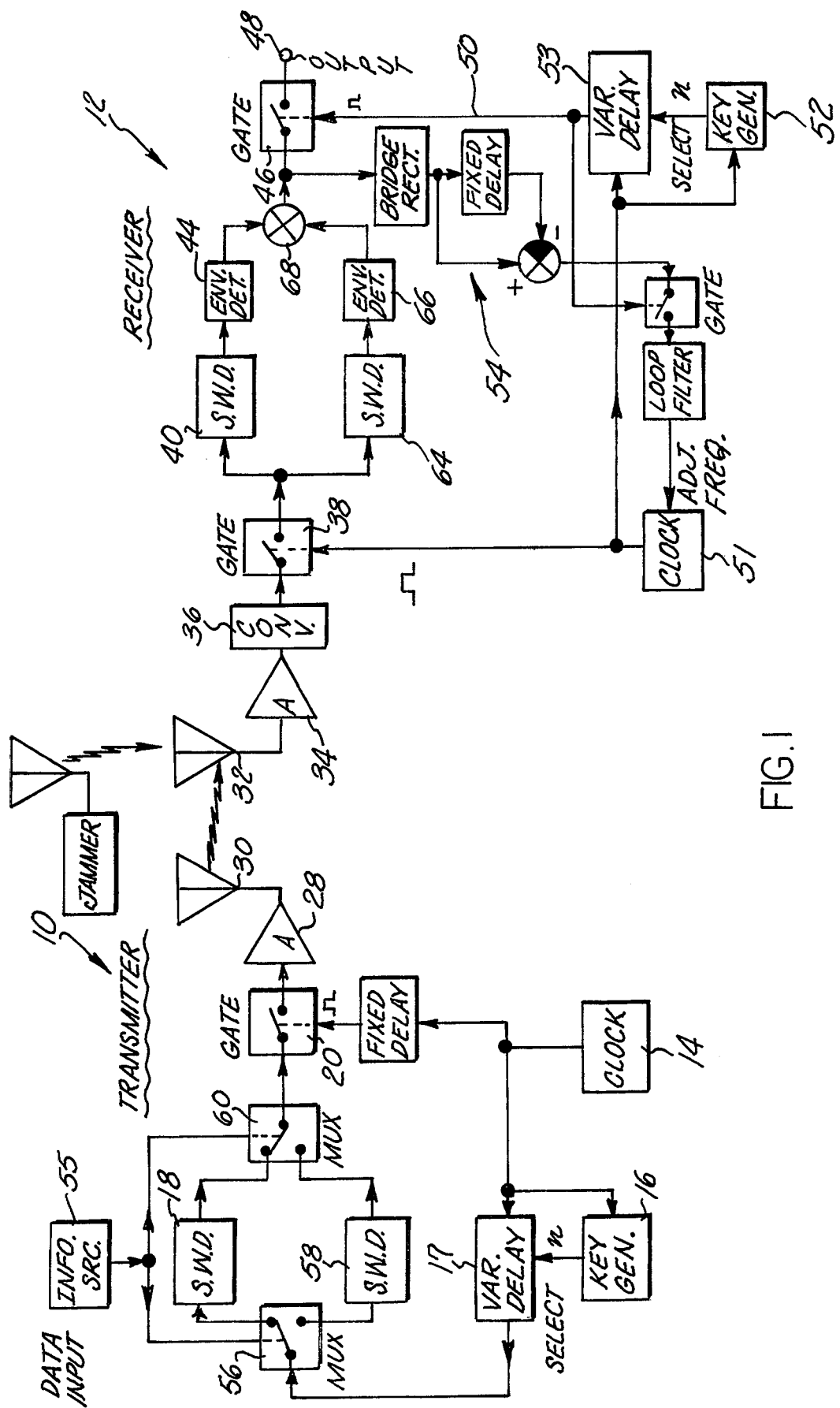
FIG. 1 is a block diagram of a chirp communication system including a transmitting station and a receiving station, that illustrates the invention.

A preferred embodiment of the invention comprises transmitting equipment 10 and receiving equipment 12, as shown in FIG. 1. The transmitter 10 produces a succession of chirp waveforms that are uniformly timed; the starting frequencies of the successive chirp waveforms are varied in a pseudo-random manner by a technique involving a clock 14, a pseudo-noise sequence generator 16, a variable delay device 17, a chirp waveform generator 18, and a gate 20. The clock 14 produces clock pulses at uniform time intervals to establish the bit rate of the communication system. The clock pulses actuate a pseudo-noise (i.e., PN) sequence generator 16 which, upon each clock pulse, selects one number n from among N available numbers, in accordance with a stored rule for selection. The sequence of numbers that are successively selected serves as a pseudo-random key for the transmitter.

The clock 14 also supplies pulses to a variable delay device 17 that delays the pulses by different amounts depending upon the number n selected by the PN sequence generator 16. The output waveform of the delay device 17 is a train of short pulses whose times of occurrence vary from the time of the uniform clock pulse train in a pseudo-reandom manner. Pulses from the delay device 17 are applied to a chirp waveform generator 18, which is preferably a surface wave device, (i.e., SWD). The pulses from the variable delay device 17 are short enough that the response that each pulse produces in the SWD 18 is essentially the impulse response of the SWD. The impulse response at the output of the SWD 18 is represented by a graph 22 of FIG. 2. Although the signals at the output of the SWD 18 start at varying times in accordance with the pseudo-random timing of pulses from the delay device 17, all of the signals represented by the graph 22 start at the same frequency and their frequency increases linearly always to the same maximum frequency, during a time interval that is long compared with the duration T of a transmitted chirp.

Output signals from the SWD 18 are applied to the static gate switch 20, which is gated to a conductive condition at uniform time intervals at the bit frequency by pulses from the clock 14. The durations of the conductive intervals of the gate 20 are all alike, and they establish the duration T of transmitted chirps. The chirps signals that the gate 20 passes to its output start at various frequecies depending upon the varying starting times of the waveforms of the SWD 18. An initial portion and a final portion of the output waveform of the SWD 18 are never used; the gate 20 selects different portions (each T seconds long), of the central region (2T long), of the signal of FIG. 2. the gates such as gate 20 and the multiplexers such as multiplexer 56 are conventional static switching devices for which the switch-type configurations in FIG. 1 merely symbolize the functions of the devices.

The N different signals that can occur at the output of the gate 20, each having a different starting frequencey, are shown in FIG. 3. Graph 24 of FIG. 3 corresponds to a relatively late occurring chirp waveform in the SWD 18, while the signal 26 of FIG. 3 results from a relatively early occurring chirp waveform in the SWD 18. In the preferred embodiment being described, the frequency vs. time slopes of all of the N signals of FIG. 3 are equal to W/T, and the duration of each of the N signals of FIG. 3 is equal to T. The N different chirp signals are orthogonal over the bit time interval. Signals from the gate 20 are amplified in a power amplifier 28 and applied an antenna 30 for radiation, in the particular embodiment being described.

The receiver 12 receives the uniformly timed chirp pulses of varying starting frequenices, compresses them into pulses of varying times of occurrence, and gates the pulses to an output only when a pulse is expected to occur, the gate timing being controlled by a random key generator that produces the same random key sequence as the PN sequence generator 16 of the transmitter. The chirp signals are initially received on an antenna 32, amplified in relatively broadband preamplifier 34, and down-converted to an intermediate frequency in a converter 36. A gate circuit 38, which follows the converter 36, is gated on at uniformly spaced time intervals at the bit rate frequency, just long enough to pass only the chirp signal pulses, and to block the noise occurring between the signal pulses.

Pulses that pass through the gate 38 are conducted to a chirp matched filter 40, which in the preferred embodiment is another surface wave device. The impulse response of the SWD 40, depicted in terms of instantaneous angular frequency w and time, is shown in FIG. 4. It has a duration of 2T, and a frequency slop of W/T. When the various chirp pulses that are described by the curves of FIG. 3 are applied to the SWD 40 they produce compressed output pulses that occur at different times depending upon the starting frequency of the particular chirp waveform applied.

The SWD 40 employs a reflective array compressor technique, which compresses the energy represented by each spread spectrum chirp signal into a relatively narrow pulse at the output of the filter 40. The pulse envelope 42 is shown in FIG. 5 for one initial frequency. A chirp of relatively low starting frequency such as the chirp represented by the line 24 of FIG. 3 produces a gated filter output pulse occurring relatively early on the time scale of FIG. 5, and a chirp of higher initial frequency such as that of the line 26 of FIG. 3 produces an output pulse from the chirp matched filter 40 that occurs relatively late on the time scale of FIG. 4.

Surface wave devices such as the SWDs 18, 40 are known in the prior art. They are described in an article entitled "Large-Time Bandwidth-Product Surface-Wave Pulse Compressor Employing Reflective Gratings" by R. C. Williamson and Henry I. Smith, Electronics Letters, Volume 8: Number 16, Aug. 10, 1972, page 401. They are also described in an article entitled "The Use of Surface-Elastic-Wave Reflection Gratings in Large Time-Bandwidth Pulse-Compression Filters" by Richard C. Williamson and Henry I. Smith, *IEEE Transactions on Sonics and Ultrasonics,* Volume SU-20, No. 2, April 1973, Page 113.

The compressed intermediate-frequency pules from the SWD 40, which occur at various times with respect to the bit times in a pseudo-random manner, are rectified in an envelope detector 44, FIG. 1, to produce baseband output pulses shaped similarly to the envelope 42 of FIG. 5. Signal pulses from the envelope dectector 44 are applied to a digital logic gate 46, which is gated on by control pulses from a conductor 50 at appropriate times to conduct the signal pulses to an output terminal 48 of the system.

The gate control pulses on the conductor 50 are produced by a local clock 51 whose uniformly occurring output pulses are delayed by various amounts in a variable delay device 53. The amount of the delay is controlled by a selection signal produced by a random key generator 52, which is synchronized with the random key generator 16 of the transmitter. The time of gating of the typical pulse 42 is shown in FIG. 5; the duration of a gate interval is T/N.

The output signal is selectively gated from energy in the other orthogonal time slots, because the pseudo-random key generators 16, 52 of the transmitter and receiver are synchronized as to both bit and phase.

The two random key generators 16, 52 are programmed by pre-agreement so as to produce identical pseudo-random sequences. When the transmitter 10 transmits chirp pulses of various initial frequencies, the receiving equipment 12 is able to track the transmitted signls because of prior information as to the sequence of initial frequencies. Before a message is sent from the transmitter to the receiver a preamble is transmitted containing timing aids that enable the pseudo-random key generator 52 of the receiver to be synchronized with the pseudo-random key generator 16 of the transmitter, in a manner well known in the prior art.

To prevent the timing of the local clock 51 at the receiver from drifting away from the timing of the clock 14 at the transmitter, a code lock loop is preferably provided at the receiver. The code lock loop produces timing corrections in the clock 51 based upon the times at which chirp signals are received, with account being taken of the program of the random key generator 52. Code lock loops are conventional and well known in the prior art, but one is described here briefly for convenience. The code lock loop includes an "early, late" circuit 54, in which a delayed pulse from the envelope detector 44 is subtracted from an undelayed pulse and the resulting difference signal is gated by the gating signal of the conductor 50 to a loop filter whose output provides an error signal for correcting the clock 51.

Various types of modulation can be employed in order to transmit information between the transmitting and the receiving stations. In the embodiment being described herein a binary modulation system is employed in which each logic 1 is represented by a chirp signal whose frequency increases with time from its starting frequency, and each logic 0 is represented by a chirp signal whose frequency decreases. An information input signal source 55 provides binary data that controls a multiplexer 56 whose output pulse drives either the positive slope SWD 18 or a negative slope SWD 58. The output of the SWD 18 is multiplexed with the output of the SWD 58 by a data-controlled second multiplexer 60 to provide a signal for the gate 20 of the transmitter.

For receiving the modulation, the receiving equipment 12 has an additional SWD chirp filter 64, which is matched for processing a negative frequency slope of chirp signals, and whose input is connected in parallel with the input of the positive SWD 40. An envelope detector 66 rectifies the output wave of the negative slope SWD 64 and produces a signal of negative polarity. The outputs of the two envelope detectors 44, 66 are added algebraically in a summing device 68, whose output is a positive signal when the information input signal is a logic 1, and is a negative signal when the information input signal is a logic 0.

If it is desired to transmit contiguous chirps without providing a buffer time interval between chirps, another complete set of SWDs are provided at the transmitter and at the receiver. The system is then operated on a time sharing basis wherein successive pulses are processed alternately by the two sets of SWDs in a manner similar to that of a time division multiple access system. This permits the signal energy of one chirp to be cleared out of a SWD before energy from the next chirp enters the SWD.

The time-bandwidth product of the chirp matched filter 40 may be minimized if desired by making the one-chirp frequency range $W = 2\pi N/T$. In such a situation, the impulse response of the matched filter 40 has twice the frequency sweep range and twice the time duration of an individual chirp signal.

The above described system is suitable for spread spectrum anti-jam communications. In a give time interval, e.g., one bit time, one of a large number N of possible chirp waveforms is transmitted; the choice is determined by the pseudo-random key generator 16 as described above. A jammer is unable to predict which particular chirp waveform will be selected, so the jammer must be content with spreading its available power over all N of the possible waveforms. This reduces the jamming power applied to disrupt the selected waveform, and therefore reduces the effectiveness of the jamming effort.

The system disclosed herein, because it spreads the pulse energy into a chirp waveform, reduces the peak-to-average power capability required of the rf transmitter 10. As a result the transmitter can be smaller than is required for more conventional jam-resistant systems such as time hopping systems, frequency hopping systems or direct sequence pseudo-noise spread spectrum systems.

An advantage of the present invention is that the matched filters such as the filter 40 can be surface wave devices as in the preferred embodiment, that are relatively inexpensive and simple. The fact that the SWDs can be time-invariant eliminates any requirement for changing of taps of the filters, such as is necessary in some other systems.

The chirp anti-jam apparatus of the present invention is compatible with various requirements that are often present for a spread spectrum communication system such as code tracking, modulation, and multiple access, e.g., time division multiple access. An advantage of the present system is that the processing of signals in a code loop is at baseband, which eliminates some mixers and intermediate frequency amplifiers.

In the invention being described, m-ary modulation is possible by using more than one at a time of the N available waveforms for modulations, but the conditions for best processing gain are changed thereby. Considerable flexibility is inherent in the chirp anti-jam method disclosed here since the assignments of the different transmitted swept signals or the different baseband time slots can be made in a variety of ways to suit the applicable modulation, multiple access, or modularity requirements.

What is claimed is:

1. Apparatus for communicating between stations comprising means including a surface wave device for producing an information bearing chirp signal starting at any one of a plurality of initial frequencies in a range, and means for transmitting said chirp signal, means for receiving said chirp signal including a unitary matched surface wave device serving as an unitary distributed filter means having time invariant parameters for compressing chirp signals starting at any of said initial frequencies in said range, and means responsive to said compressed chirp signals for recovering the information content therefrom.

2. Apparatus for communicating between stations as defined in claim 1 and wherein said means for producing said chrip signal comprises means for selecting a chirp signal having one of said plurality of initial frequencies in accordance with predetermined criteria for generating a sequence of chirp signals.

3. Apparatus for communicating between stations comprising means including a surface wave device for producing a chirp signal starting at any of a plurality if initial frequencies in a range and further including means for selecting a chirp signal having one of said plurality of initial frequencies in accordance with predetermined criteria for generating a sequence of chirp signals, means for transmitting said chirp signal, means for receiving said chirp signal including a unitary matched surface wave device serving as an unitary distributed filter means having time invariant parameters for compressing chirp signals starting at any of said initial frequencies in said range, and wherein said distributed filter means comprises means for producing an output signal after a time delay that varies in dependence upon said initial frequency, and wherein said means for receiving said chirp signal further comprises gating means following said filter for producing a time window for passing the output signal of said filter including means for changing the time of occurrence of said time window to pass signals from chirps having any one of said initial frequencies.

4. Apparatus for communiating between stations as defined in claim 3 and wherein said means for changing the time of occurrence of said time window includes means for selectively setting said time of occurrence in accordance with said predetermined criteria for generating a sequence.

5. Apparatus for communicating between stations as defined in claim 4 and further comprising a code tracking circuit comprising means for correcting the time of occurrence of subsequent time window intervals of said gating means.

6. Apparatus for communicating between stations as defined in claim 1 and wherein said means for transmitting a chirp signal compises means for transmitting a chirp signal whose rate of change of frequency with respect to time is the same irrespective of said intiial frequency.

7. Apparatus for communicating between stations as defined in claim 1 and wherein said unitary distributed filter means adapted for chirp signals includes a surface wave device for compressing the energy distributed in said chirp signal into a pulse having a shorter duration than said chirp signal.

8. Apparatus for communicating between stations as defined in claim 1 and wherein said unitary distributed filter means comprises matched filter means having an impulse response of the same rate of change of frequency, twice the frequency sweep, and twice the time duration of one of said chirp signals.

9. Apparatus for communicating between stations comprising means including a surface wave device for producing a chirp signal starting at any one of a plurality of initial frequencies in a range, means for transmitting said chip signal, means for recieving said chirp signal including a unitary matched surface wave device serving as an unitary distributed filter means having time invariant parameters for compressing chirp signals starting at any of said intial frequencies in said range, and wherein said means for receiving said chirp signal further comprises local timing means producing control signals, and means preceding said unitary distributed filter means for gating on the received chirp signal for the duration of the chirp in response to said control signals of said local timing means.

10. Apparatus for communicating between stationa as defined in claim 1 and further comprising an envelope detector following said unitary distributed filter means for detecting an output signal from said filter means.

11. Apparatus for communicating between stations comprising means including a surface wave device for producing a chirp signal starting at any one of a plurality of initial frequencies in a range, means for transmitting said chirp signal, means for receiving said chirp signal including a unitary matched surface wave device serving as an unitary distributed filter means having time invariant parameters for compressing chirp signals starting at any of said initial frequencies in said range, and wherein said chirp signal represents one data state, and comprising means including a second surface wave device for transmitting a distinguishably different second chirp signal representing a second data state, and further comprising modulation means for selecting said first and second chirp signals in accordance with information to be communicated.

12. Apparatus for communicating between spaced apart stations comprising means including an unitary surface wave device for producing an succession of chirp signals each starting at one of a plurality of initial frequencies within a range and having a fixed slope of frequency variation with respect to time, means for selecting one of said plurality of initial frequencies for each of said chirp signals in accordance with predetermined criteria for generating a sequence, means for transmitting said chirp signals, means spaced apart from said transmitting means for receiving said chirp signals including an unitary matched surface wave device serving as an unitary distributed filter means having time invariant parameters for receiving chirp signals starting at any of said initial frequencies within said range and for producing an output signal due to each chirp signal after a time delay dependent upon said initial frequency, gating means for producing a time window for passing said output signals from said filter means and time adjustable to pass output signals due to chirps having any of said initial frequencies, and means for selectively adjusting the time of occurrence of said time window in accordance with said predetermined criteria.

13. Apparatus for communicating between spaced apart stations as defined in claim 12 and wherein said chirp signals represent one data state, and comprising means including a second unitary surface wave device for transmitting and receiving distinguishably different second chirp signals representing a second data state, and further comprising modulation means for selecting said first and second chirp signals in accordance with information to be communicated.

* * * * *